No. 629,117.  Patented July 18, 1899.
C. E. WINGATE.
VEHICLE WHEEL.
(Application filed Feb. 28, 1899.)

(No Model.)

Witnesses:

Inventor
Charles E. Wingate
By James J. Sheehy
Attorney

UNITED STATES PATENT OFFICE.

CHARLES E. WINGATE, OF LAWRENCE, MASSACHUSETTS.

VEHICLE-WHEEL.

SPECIFICATION forming part of Letters Patent No. 629,117, dated July 18, 1899.

Application filed February 28, 1899. Serial No. 707,196. (No model.)

*To all whom it may concern:*

Be it known that I, CHARLES E. WINGATE, a citizen of the United States, residing at Lawrence, in the county of Essex and State of Massachusetts, have invented new and useful Improvements in Vehicle-Wheels, of which the following is a specification.

My invention relates to that class of vehicle-wheels which have tires constructed with a view of preventing sluing of a vehicle when turning a corner as well as when traveling at a rapid rate of speed over a slippery surface.

It consists in the peculiar and advantageous construction hereinafter described, and particularly pointed out in the claim appended.

Figure 1:
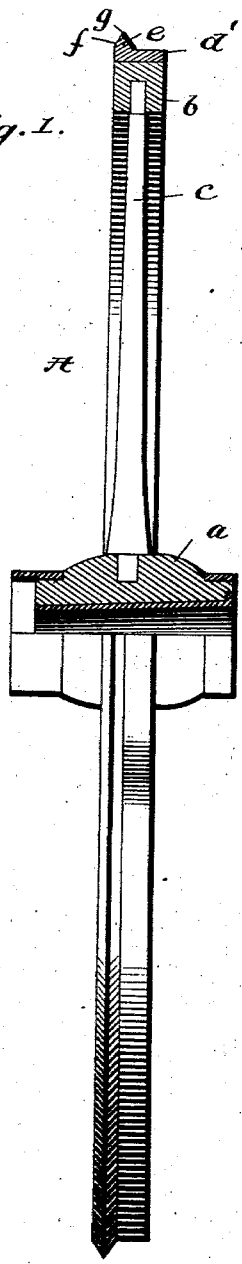
Figure 2:
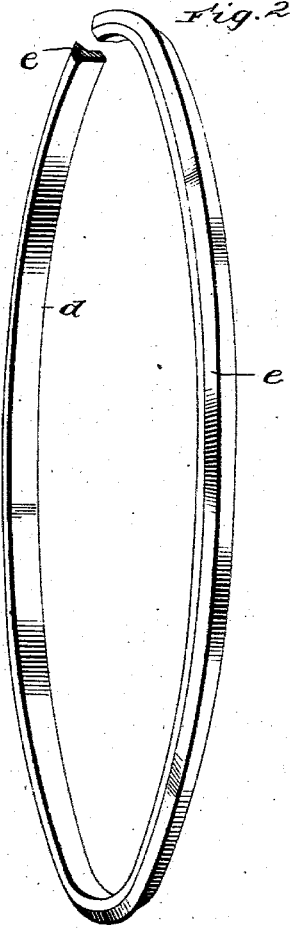

In the accompanying drawings, Figure 1 is a view, partly in section and partly in elevation, of a vehicle-wheel embracing my improvements. Fig. 2 is a broken perspective view of the tire of the wheel.

In the preferred embodiment of my invention the wheel A embraces a hub $a$, a felly $b$, spokes $c$, interposed between and secured in the hub and felly, and a tire $d$, secured on the felly in the ordinary or any approved manner. These parts, with the exception of the tire $d$, may be and preferably are of the ordinary construction, as illustrated.

The tire $d$ differs from ordinary metallic tires in that it has a plain peripheral surface $d'$ and is provided at its outer edge or center with an integral peripheral flange $e$. This flange $e$ has for its purpose to engage or take hold of the roadway over which a vehicle provided with the wheel is traveling, and thereby effectually prevent sluing of the vehicle when turning a corner. Said flange is also calculated to effectually prevent sluing of the vehicle when traveling at a high rate of speed over a slippery roadway or other surface, which is an important advantage.

The flange $e$ is of the shape in cross-section shown in Fig. 1—that is to say, its opposite sides are straight and beveled, as indicated by $f$, so as to afford a sharp edge $g$. This shape of flange is desirable, because it is adapted to sink in and take a secure hold on the roadway and also because it is calculated to wear sharp, and will in consequence always have a sharp edge.

The plain peripheral surface $d'$ of the tire does not in any way interfere with the operation of the flange $e$ and yet prevents the tire from sinking so far into the surface over which the vehicle is traveling as to increase the draft of the vehicle.

My improved vehicle-wheel may be used to advantage on all kinds of vehicles. It is particularly adapted, however, for use on fire-engines, hose-carriages, ambulances, and similar vehicles.

A wheel embodying my invention may form one of the set of wheels with which a vehicle is equipped, or, if preferred, the improved wheel may form simply an auxiliary wheel designed to be used in lieu of one of the ordinary wheels when the roadways are slippery.

Having thus described my invention, what I claim is—

The herein-described vehicle-wheel having a tire provided with the exterior, plain surface $d'$ and the integral peripheral flange $e$ of a less width than the surface $d'$; the said flange having its opposite sides straight and beveled and also having a sharp edge and being adapted to wear sharp, and the plain surface $d'$ being adapted to prevent the tire from sinking so far into the surface as to increase the draft and this without interfering with the operation of the flange, substantially as specified.

In testimony whereof I have hereunto set my hand in presence of two subscribing witnesses.

CHARLES E. WINGATE.

Witnesses:
EDWARD J. WARD,
DANIEL COMERFORD.